United States Patent [19]

Melnikov et al.

[11] Patent Number: 4,911,282
[45] Date of Patent: Mar. 27, 1990

[54] APPARATUS FOR ORIENTING DISCRETE PRODUCTS IN FEEDING UNITS OF PLANTS

[76] Inventors: Leonid I. Melnikov, ulitsa D.Donskogo, I9, kv. I9; Alexandr M. Klimenov, ulitsa Nevelskogo, 5, kv. 45; Vladimir T. Gradoboev, ulitsa Kropotkina, I20/I, kv. 86; Alexandr E. Sitnikov, ulitsa Leskova, 250, kv. 39, all of Novosibirsk, U.S.S.R.

[21] Appl. No.: 320,980

[22] Filed: Mar. 9, 1989

Related U.S. Application Data

[63] Continuation-in-part of Ser. No. 241,756, Sep. 7, 1988, abandoned, which is a continuation of Ser. No. 41,138, Feb. 20, 1987, abandoned.

[30] Foreign Application Priority Data

Jun. 27, 1985 [SU] U.S.S.R. .............................. 3916211

[51] Int. Cl.$^4$ ............................................. B65G 47/14
[52] U.S. Cl. ................................... 198/396; 198/399; 198/400; 198/550.1
[58] Field of Search ............... 198/396, 398, 399, 400, 198/416, 455, 383, 625, 550.1, 550.6; 221/171, 173

[56] References Cited

U.S. PATENT DOCUMENTS

| | | | |
|---|---|---|---|
| 2,173,414 | 9/1939 | Fulton | 198/550.1 X |
| 2,336,606 | 12/1943 | Everett | 198/45 X |
| 2,694,256 | 11/1954 | Coon, Sr. et al. | 198/550.1 X |
| 3,690,437 | 9/1972 | Kammann | 198/400 X |
| 3,791,508 | 2/1974 | Osborne et al. | 198/666 X |
| 3,797,640 | 3/1974 | Aidlin et al. | 221/157 |
| 4,690,267 | 9/1987 | Gradoboev et al. | 198/396 |

FOREIGN PATENT DOCUMENTS 1188063 10/1985 U.S.S.R. .
1189759 11/1985 U.S.S.R. .

Primary Examiner—Robert J. Spar
Assistant Examiner—Cheryl L. Gastineau
Attorney, Agent, or Firm—Burgess, Ryan and Wayne

[57] ABSTRACT

A distinguishing feature of the device for orienting piece products resides in its being provided with a vertical feed screw, a guide and a restrictor aimed at assigning a required transit position to the products being oriented as well as a device for removal of the properly oriented products located in close proximity to the feed screw, a curvilinear restrictor being interposed between the device for removal of the properly oriented products and the feed screw, said curvilinear restrictor having at least one opening aimed at kicking out correctly and wrongly oriented products therethrough, the former products being free to pass to the device for removal of properly oriented products, whereas the latter products get in engagement with the side face of the opening, become oriented in a correct position and then are free to pass to the device.

2 Claims, 4 Drawing Sheets

APPARATUS FOR ORIENTING DISCRETE PRODUCTS IN FEEDING UNITS OF PLANTS

FIELD OF THE INVENTION

The present invention is continuation-in-part of U.S. application Ser. No. 241756, filed at U.S. Patent Office, Sept. 7, 1988, now abandoned, which is a simple continuation of U.S. application Ser. No. 041,138, filed 2/20/87, now abandoned, and relates generally to materials handling equipment and more specifically, to devices for orienting piece products, in the course of conveyance, such as bodies of revolution with an offset centre of gravity in feeding units of industrial plants.

PRIOR ART

Feeding of piece products from bulk to a working position of technological equipment or machinery necessitates imparting a definite space attitude to the products being fed, which is dictated by the required technological processes. Thus, putting al the products being handled in a strictly definite position is in fact the process of products' orientation.

To determine whether the products being fed are in a correct (oriented) or wrong position one can proceed from constructional features of the surface profile of such products, e.g., recesses, flanges, a spherical end face, and so on, or also from an offset position of the centre of gravity towards one of the product's ends.

Known in the present state of the art is a device for orienting piece products having a convex surface.

The device comprises a conveyer, which is in fact a guide with a slot accommodating a screw. The threads of said screw extend from the slot by an amount equal to the depth of recess in the product being handled, while the screw pitch and diameter correspond to the width of the recess in the product involved.

A disadvantage inherent in the known device resides in its low throughput capacity resulting from removal of wrongly oriented products from the conveyer.

Besides, multiply repeated loading of the same products in an unoriented position and their subsequent return into the loading bin results in flaws on the surface of the products being handled, which affects adversely the processing capabilities of the device under discussion.

One more state-of-the-art orienting device (SU, A, No. 1,188,063) is known to comprise a vertical feed screw, a guide, a straight restrictor and a curved restrictor, as well as a product's position detecting gauge, which is adjusted for specific features of the products' surface profile, such as a hole, shoulder, flange, chamfer, and others.

When the product is fed in a properly oriented position the position detecting gauge does not impede its further motion along a preset pathway. Conversely, a wrongly oriented product is caught by said detecting gauge and directed to the orientation unit, wherein the product is assigned a properly oriented position, whereupon the product is forwarded to join the main group of the products being handled.

A disadvantage of the known device resides in too high precision involved in the manufacture and mutual arrangement of its components, which is called forth by a necessity for recognizing the products' position against diverse distinctive features, often unconspicuous, of their end faces. For instance, the shape of the position detecting gauge and its mutual position relative to the control gauge to a great extent depends on the size and shape of the surface of the products being oriented.

However, such a precision combination of the products' shape with the shape and arrangement of the elements of the orienting device requires high dimensional stability of the products being oriented, as well as dimensional stability of the aforesaid elements. Any violence of the aforestated prerequisites resulting from the departure of the product's shape impermissible for a given orienting device but acceptable to the technological process involved (i.e., irregularly cut edge of the product's end face), or any change in the relative dimensions of the elements of the device due to their wear, results in operational failures, which affects operating reliability of the known orienting device.

Such a construction arrangement and positioning of the components of the known device in combination with the external shape of the product being oriented becomes necessary when the material of the product involved is distributed rather uniformly over its volume and its centre of gravity is located in its middle portion, accordingly.

However, there are in widespread use in mechanical engineering such products that have their centre of gravity offset towards one of the ends rather than located in the middle portion. Such products are capable of responding differently to a change in the plane of their bearing. For instance, the product drops down from the plane with its heavier end forward when the latter is extended to a less extent than the product's opposite lighter end.

The orienting device discussed above is applicable for orienting the aforementioned products with an offset centre of gravity, though in this case the abovesaid feature of the device is not utilized. At the same time the use of an offset centre of gravity feature considerably simplifies the process of recognition of a product and its turn into a properly oriented position, which makes it possible to provide orienting devices simpler in construction and more reliable in operation.

SUMMARY OF THE INVENTION

It is a primary object of the present invention to provide a device for orienting piece products of the type of bodies of revolution having its centre of gravity offset towards one of their ends.

It is one more object of the invention to simplify the function of the orientation process and to change over to a simpler construction arrangement of the components of the orienting device.

It is another object of the invention to attain higher throughput capacity and operating reliability of the orienting device proposed herein.

The foregoing and further objects of the invention are accomplished due to the fact that in a device for orienting piece products in feeding units of industrial plants, comprising a vertical feed screw, a guide and a restrictor for assigning the products being oriented a position required for their conveyance, according to the invention, provision is made for a means for removal of the properly oriented products, said means being situated in close proximity to the feed screw, and a curvilinear restrictor is interposed between the means for removal of the oriented products and the feed screw, said curvilinear restrictor having at least one opening adapted for correctly and wrongly oriented products to kick out therethrough, of which the former products are free to pass to the aforesaid means for removal of the properly oriented products, while the latter products get engaged with the side face of said opening to become properly oriented, whereupon they are also free to pass to said means.

It is expedient that the means for removal of the properly oriented products be shaped as a screw whose axis is arranged parallel to the axis of the feed screw so that each working segment of the feed screw should be situated above the corresponding working segment of the screw removing the properly oriented products in order that a step should be provided therebetween.

The essence of the present invention is as follows.

Provision of at least one opening in the curvilinear restrictor, which lies across the pathway of the products being handled, makes it possible to kick said products into said opening by virtue of the centrifugal force developed by the feed screw. Before being kicked out through the opening, the products being handled are deflected therein at different angles in the direction of the feed screw rotation, depending on the position of the product in the screw plane, i.e., with its heavier or lighter end forward. In particular, the product moving with its heavier end forward gets into the opening at a smaller angle of deflection, while the lighter end of the product being handled deflects at a greater angle.

It is due to the aforesaid feature of the products being handled that the width of the opening is so selected that the product's lighter end would not have time enough to drop out and would be engaged with the side vertical face of the opening. As a result, there is provided an unimpeded passing through the opening of such products that are passed with the heavier end forward, whereas the products that are fed with their lighter end forward are caught by said opening. Further reorientation of the thus-caught product is carried out in the course of its vertical movement due to bringing the heavier end of said product out of contact with the surface of the curvilinear restrictor followed by kicking out the product in a properly oriented position into the means for removal of the properly oriented products.

A simple function performed by the aforesaid opening and consisting in catching the products by their lighter end, in conjunction with its simple construction arrangement provides for high reliability of the orientation process.

Disposition of the curvilinear gauge in a space between the feed screw and the means for removal of the properly oriented products makes it possible to transfer the oriented products being kicked out to said means along the shortest possible pathway, which also adds to the reliability of the orientation process.

Provision of the means for removal of the properly oriented products as a screw located parallel to the feed screw and operatively associated therewith, enables the products to retain an interval therebetween unaffected when being transferred from the feed screw to the screw for removal of the properly oriented products despite the fact that in the course of orientation said products come out of the opening in the curvilinear restrictor at different levels.

Provision of steps between the working segments of the feed screw and the corresponding segments of the screw for removal of the properly oriented products eliminates obstacles to the turning of the product's lighter end in the opening, thereby adding to reliability of the orientation process.

BRIEF DESCRIPTION OF THE DRAWINGS

In what follows the present invention will be disclosed in a detailed description of a specific exemplary embodiment thereof with reference to the accompanying drawings, wherein.

The proposed device for orienting piece products in feeding units of industrial plants is aimed at orienting piece products of the type of bodies of revolution having their centre of gravity offset towards one of their ends. Classified as such products may be all items having an interior space, i.e., the products of the sleeve type, whereas the outer surface of the product plays no part whatever in the orientation process.

BEST MODE OF CARRYING OUT THE INVENTION

The device (FIGS. 1, 2) comprises a vertical feed screw 1 along which are arranged a guide 2 and a restrictor 3. A curvilinear restrictor 4 is provided as an extension to the guide 2.

Figure 3:
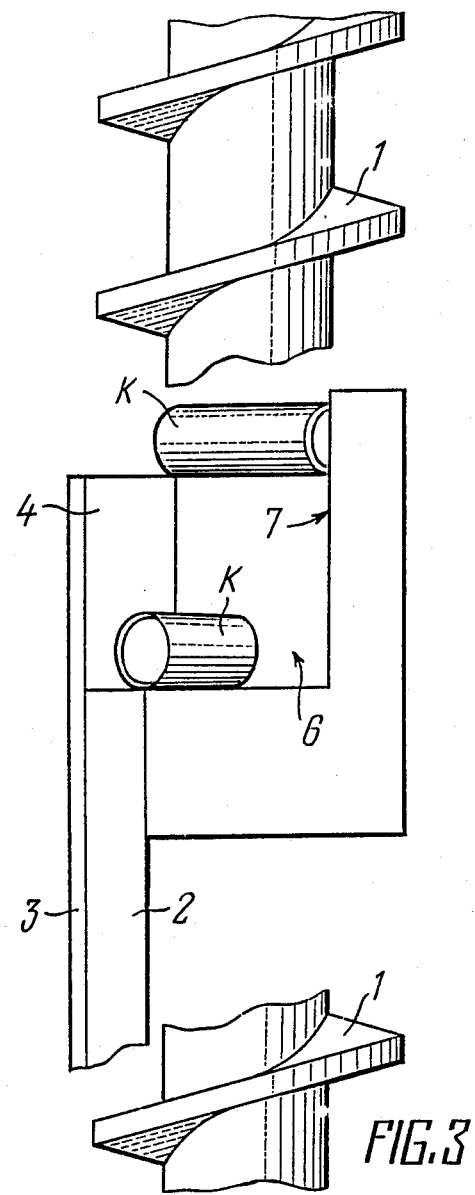
FIG. 3 is a view facing the arrow B in FIG. 2.

According to the invention, the curvilinear restrictor 4 is interposed between the feed screw 1 and a means 5 for removal of the properly oriented products and is provided with at least one opening 6, which has a side face 7 (FIG. 3).

The means for removal of the properly oriented products is shaped as a screw 8 (FIG. 2) arranged parallel to the feed screw 1. Synchronous rotation of the both screws is attained due to their operative association, through, e.g., a chain transmission. The working segments of the feed screw 1 are situated above the corresponding working segments of the screw 8 for removal of the properly oriented products so as to form steps 9 therebetween.

Besides, elements 10 and 11 are provided in the means 5, said elements being aimed at holding the products being handled in a preset position.

Figure 1:
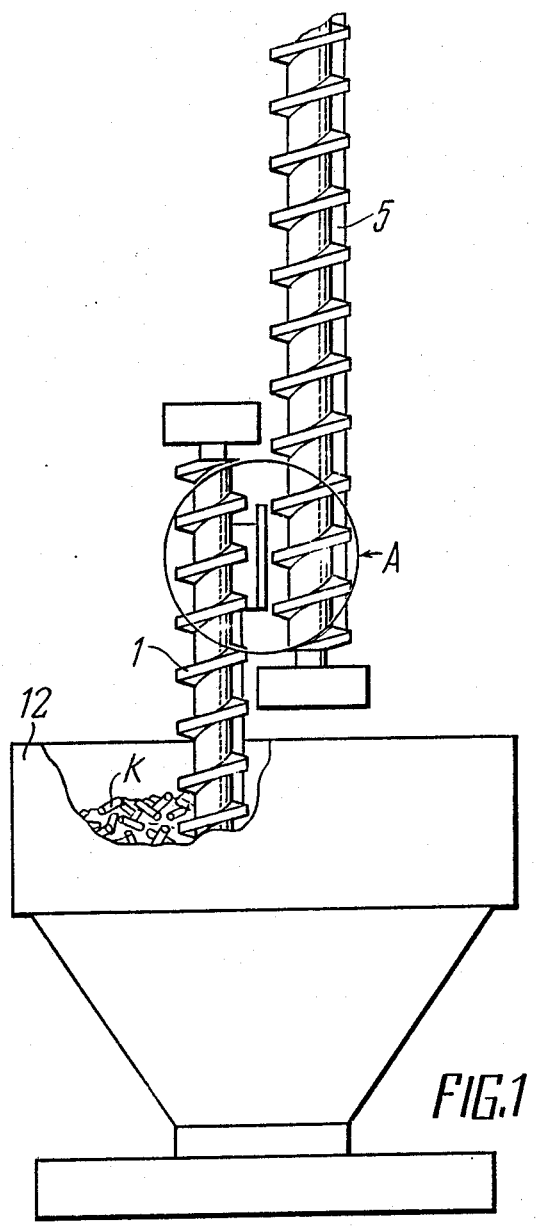
FIG. 1 is a general view of a plant which feeds products piecewise to a device for their orientation, according to the invention.
Figure 2:
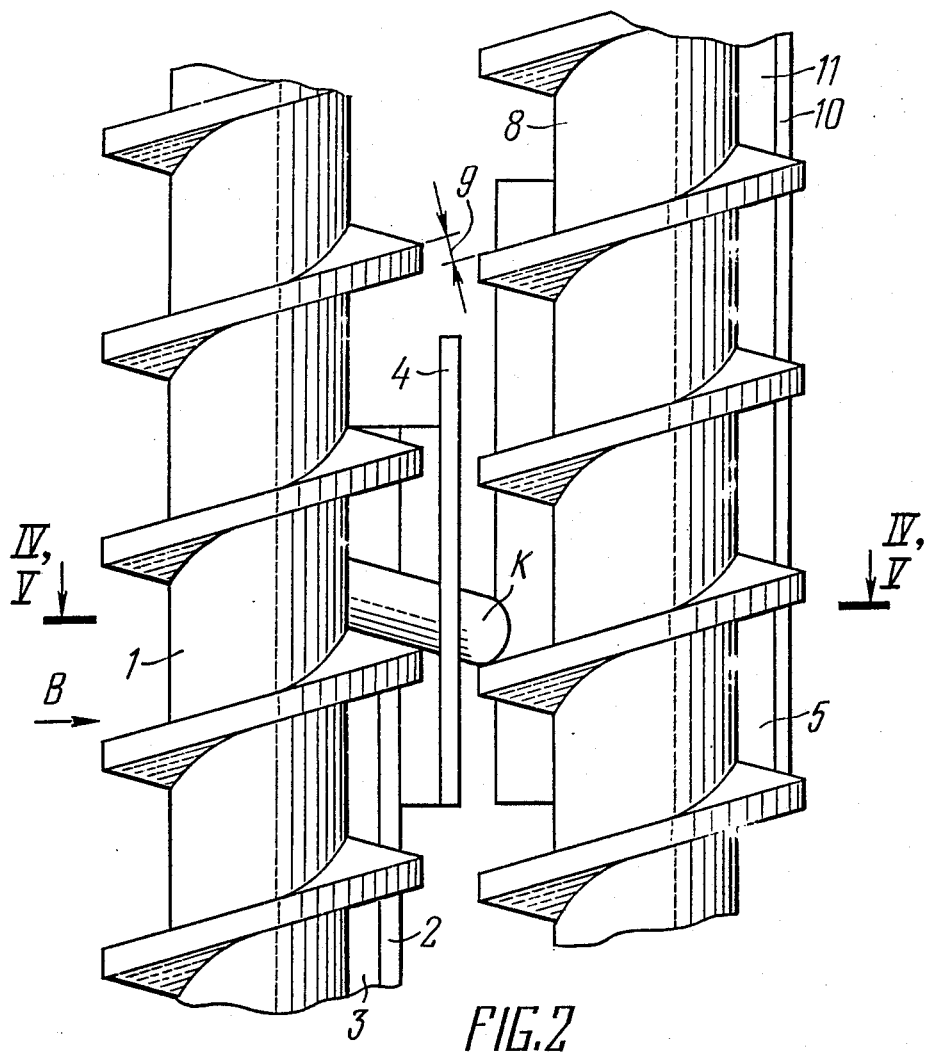
FIG. 2 is a unit A in FIG. 1.

The device as shown in FIG. 1 incorporates a feed bin 12 having its inner surface so shaped as to provide permanent feed of the products to the feed screw 1.

The proposed device for orienting piece products in feeding units of industrial plants operates as follows.

Products 'K' charged into the feed bin 12, are loaded into a helical passage of the feed screw 1 when the latter is set in rotation from a power drive (omitted in the Drawing) and, while ascending, are fed to the orientation device. The thusloaded products are kept against joint rotation with the feed screw 1 by virtue of the guide 2 and the restrictor 3 on which the product's end face and side surface, respectively, rest during motion of the product.

The products 'K' can assume either of the two positions in the helical passage of the feed screw 1, that is, a correctly oriented position, wherein the product contact the guide 2 with its heavier end, and a wrongly oriented position, wherein the product contacts the guide 2 with its opposite, lighter end.

While moving upwards and sliding over the guide 2 the product 'K', upon leaving the latter, gets in contact with the curvilinear restrictor 4. As a result, the product 'K' looses its support on the guide 2 and starts turning in a horizontal plane along with the feed screw 1 so that its end portion is urged, by the centrifugal force, to press against the inner surface of the curvilinear restrictor 4, thus following its profile.

While sliding over the inner surface of the curvilinear restrictor 4, the end of the product reaches the opening 6 provided in said restrictor. It is in said opening that the property of an offset centre of gravity manifests itself, depending on whether the product has passes to the opening with its heavier or lighter end. This property consists in that the product with an offset centre of gravity responds differently to a change in the plane of its support. For instance, the product drops down from the plane with its heavier end forward when the latter is extended to a less degree than the product's opposite, lighter end.

Figure 4:
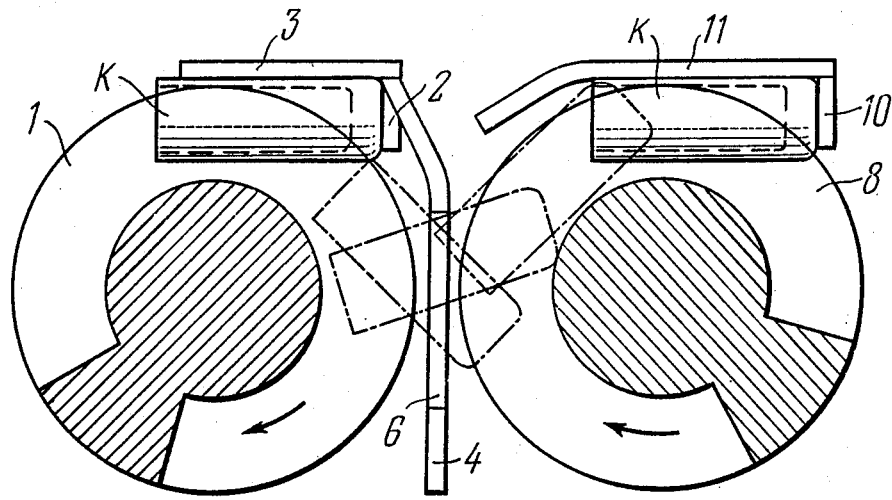
FIG. 4 is a section taken along the line IV—IV in FIG. 2 showing the pathway of a correctly oriented product, i.e., with its heavier end forward.

As a result of the aforesaid property the product 'K' fed into the opening with its heavier end forward will be kicked out of its by virtue of the centrifugal force, while dwelling for a lapse of time (at an angle of turn of the screw feed 1) at the step 9 (FIG. 2) between the plane of the screw 1 on which the product is located and the plane of the screw 8. The process of extension of the product from the opening 6 will continue until the centre of gravity of the product comes outside the limits of the aforesaid step. At that instant the heavier end of the product will outbalance and contact the surface of the screw 8. Further on the product, while being carried by said surface, will continue its way along a path presented in FIG. 4. In the final analysis the product will occupy a stable transit position on the screw 8 resting with its end and side surfaces upon the elements 10 and 11, respectively, while its original oriented position remains unaffected.

Whenever the product 'K' is fed to the opening 6 with its lighter end forward, the entire kicking-out process proceeds in a way similar to that described above. However, the lighter end of the product should extend for a greater length than its heavier end before the centre of gravity gets beyond the edge of the step 9. However, such as increased extension is accompanied by a greater displacement of said end of the direction of rotation of the feed screw 1 with respect to the aforediscussed displacement occurring the case of extension of the product's heavier end.

Figure 5:
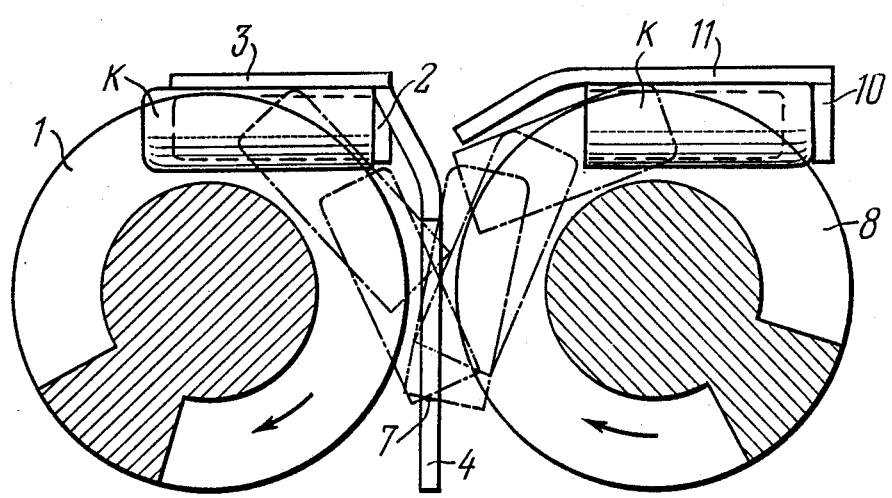
FIG. 5 is a section taken along the line V—V in FIG. 2 showing the pathway of a wrongly oriented product, i.e., with its lighter end forward and how such a product is reoriented.

Taking account of the various pathways along with the product's heavier and lighter ends are to escape from the opening 6, the width of said opening should be so selected that the lighter end of the product should meet on its way through the opening 6 an obstacle in the form of the side face 7 of said opening (FIG. 5), which would retain the product from falling out of the feed screw 1. In this case the heavier end of the product cannot reach said side face, since it passes along the shortest pathway to the plane of the screw 8 and is carried by said plane in the opposite direction. A wrongly oriented product hindered in the opening 6 rests with its lighter end upon the side face 7 and with its heavier end, upon the inner surface of the curvilinear restrictor 4 (FIG. 3) and is moved by the feed screw 1 vertically along said opening. Having reached the top level of the curvilinear restrictor 4 the heavier end of the product is released from the action of said restrictor earlier than its lighter end and, while being kicked out by the feed screw 1, passes onto the plane of the screw 8. The product carried away by said plane, now in a properly oriented position, that is, with the heavier end forward, likewise assumes a stable transit position resting upon the elements 10 and 11 with its end and side surface, respectively. This terminates the orienting process.

It is obvious from all discussed above that the present orienting device is applicable for handling a wide variety of products having their centre of gravity offset towards one of their ends.

Industrial Applicability

The present invention can find most utility when applied in mechanical engineering, and more specifically, in the manufacturing industry, e.g., in pressworking metalworking and metalcutting, assembling, and other trades.

Freedom from sophisticated construction elements in combination with a simple essence of the orientation process based on the use of the effect of an offset centre of gravity in the products being oriented tells favourably on the operating reliability of the present orienting device and improves its performance.

Moreover, no relationship between the components of the device and the external shape of the products being oriented renders the device substantially universal, thereby extending its processing capabilities.

The aforesaid advantageous features of the device enable it successfully applicable in most diverse industries requiring high productivity and reliability of technological processes, such as pressworking, quality control, capping, and so on.

What is claimed is:

1. A device for orienting piece products of the type having a center of gravity offset towards one of the ends of the product in feeding units of industrial plants, comprising:
    a vertically arranged feed screw;
    a guide and a restrictor aimed at assigning the product being oriented a required transit position;
    a means for removal of the properly oriented products, situated in close proximity to said feed screw;
    a curvilinear restrictor interposed between said fed screw and said means for removal of the properly oriented products and having a working surface mating the surface of said guide;
    at least one opening made in said curvilinear restrictor and adapted for kicking out properly and improperly oriented products therethrough so that the properly oriented products are free to pass to said means for removal of the properly oriented products, whereas said improperly oriented products become engaged with a side face of said opening due to the offset centers of gravity of the products which cause the improperly oriented products to deflect differently than the properly oriented products, become oriented in a correct position and pass to said means for removal of the properly oriented products.

2. A device as claimed in claim 1, wherein the means for removal of the properly oriented products is shaped as a screw whose axis is parallel to the axis of the feed screw, while each working segment of the feed screw is situated above the corresponding working segment of the screw for removal of the properly oriented products so as to establish a step together therewith.

* * * * *